Sept. 14, 1965   R. D. MOORE   3,205,860
STOCK FEEDER

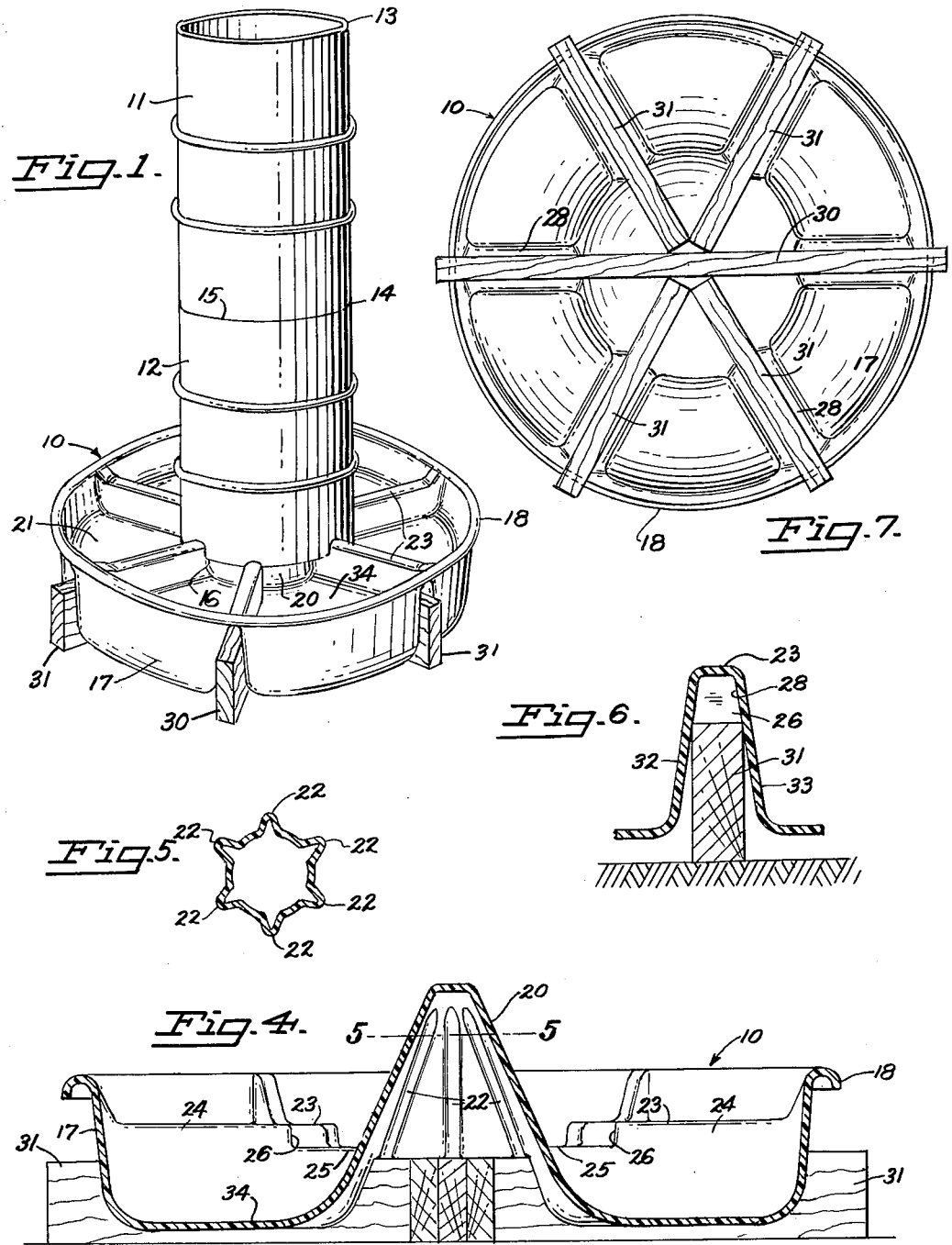

Filed Sept. 9, 1964   5 Sheets-Sheet 2

INVENTOR.
ROBERT D. MOORE
BY
Owen, Wickersham & Erickson
ATTORNEYS

INVENTOR.
ROBERT D. MOORE
BY
Owen, Wickersham & Erickson
ATTORNEYS

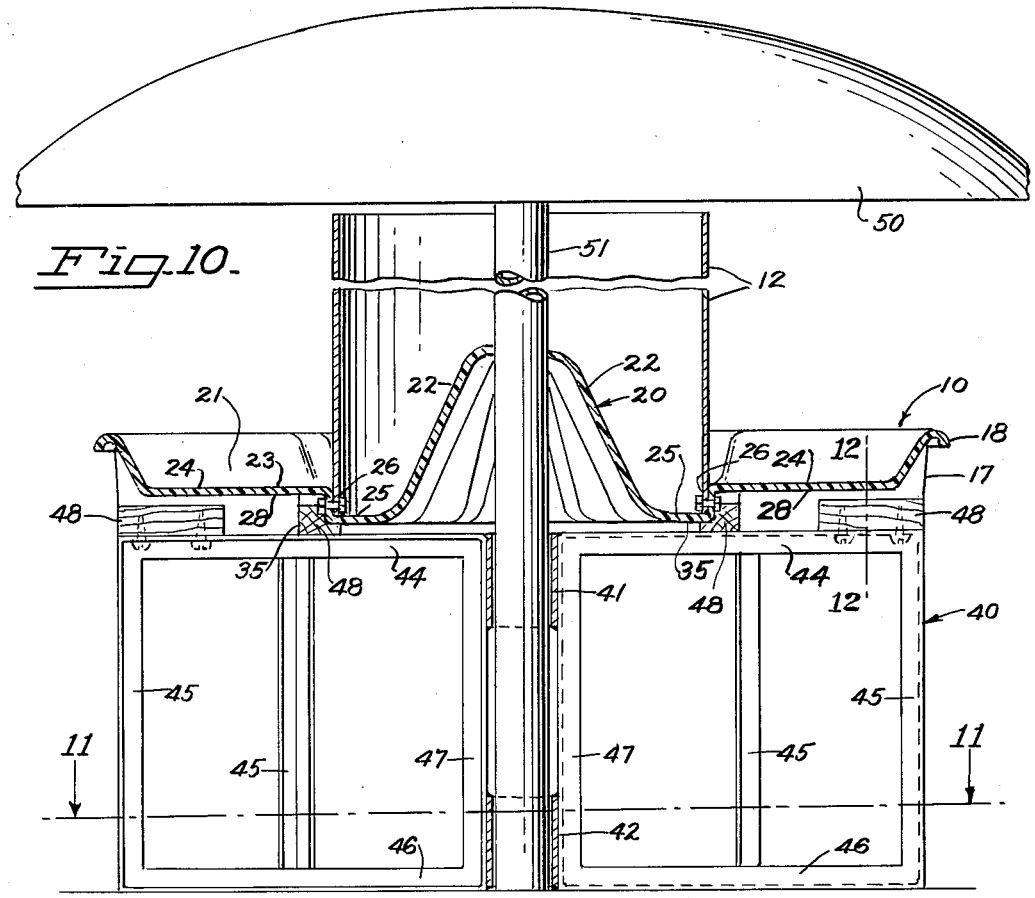
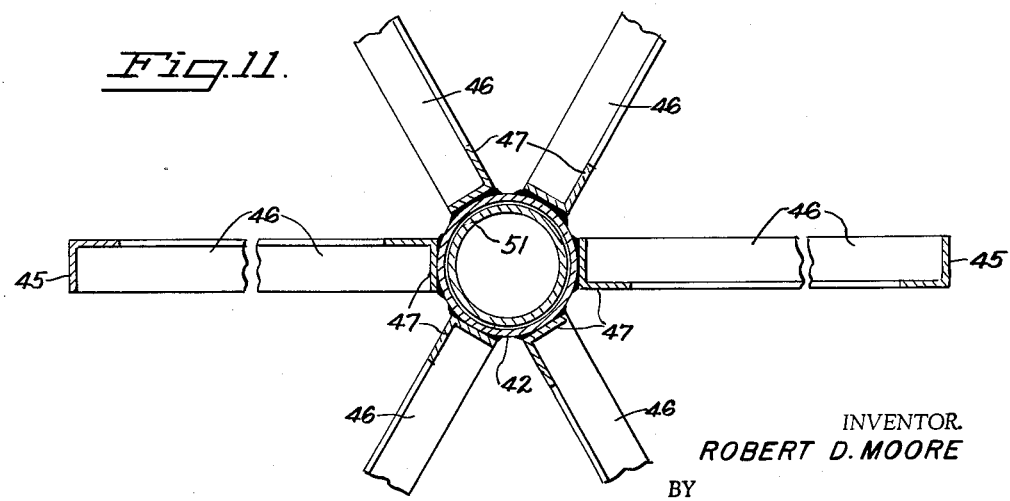

Sept. 14, 1965

R. D. MOORE 3,205,860

STOCK FEEDER

Filed Sept. 9, 1964

INVENTOR.
ROBERT D. MOORE
BY
Owen, Wickersham & Erickson
ATTORNEYS

United States Patent Office 3,205,860
Patented Sept. 14, 1965

3,205,860
STOCK FEEDER
Robert D. Moore, Los Angeles, Calif., assignor to Carnation Company, Los Angeles, Calif., a corporation of Delaware
Filed Sept. 9, 1964, Ser. No. 396,476
18 Claims. (Cl. 119—52)

This application is a continuation-in-part of application Serial Number 333,568 filed December 26, 1963, now abandoned.

This invention relates to an improved stock feeder.

Stock feeders heretofore in use have tended to be inefficient and to cause wastage of food. Bunkers typically have had widely exposed areas subject to damage by wind and rain; moreover, they have had to be filled daily because of their relatively small capacities. Stock feeders with storage and self-filling facilities have been expensive to purchase, to use, and to maintain. Both bunkers and the more complex feeders have been either easily damaged by or damaging to or disliked by the stock. They have had metallic or rough wood surfaces that at best discouraged calves, foals, horses, cattle and other animals from cleaning up all their feed. Metal feeders, being heat conductors, have tended to be either too hot or too cold to the touch and have tended to rust and to dent; wooden feeders have been liable to break, or rot, or splinter, and they have been liable to absorb objectionable materials, such as spoiled feed. Both metal and wooden types have been unpleasant for the animal to touch with the tongue, mouth, or nose and have generally been uneconomical and unsatisfactory, being high in initial cost and short-lived under range conditions.

These prior-art stock feeders have been quite heavy, and therefore they have been difficult to move from place to place. Now, a farmer should move his feeder every few months, or else the area around it becomes a mud hole and the nearby pasture area tends to be destroyed. Yet, farmers have generally not moved their feeders as often as they should, because of the work involved in doing so, due to the heavy weight of the prior-art feeders and to their great bulk which did not fit in most trucks. They have often had to wait for months until it was feasible to bring heavy equipment and extra laborers around to move the feeders. Also, these prior-art stock feeders tended to bend or break during moving.

Even at the time of installation, the farmer either had to build his own feeder or to buy one that was shipped to him in knocked-down condition, requiring in either event hours of assembly time in order to get the feeder actually built and into operation.

The feed in prior-art bunkers had to be replaced every day, and in the more complicated feeders having some storage facilities there have been difficulties in getting proper grain flow. In both types of prior-art feeders it has been difficult to keep the feeding receptacles full and in proper condition for feeding.

When such feeders have been filled with salt or livestock minerals, corrosion or rot has been accelerated, and molasses has tended to corrode them or to flow into pores where it fermented and offended the sense of smell of the stock.

The present invention is directed to the solution of these many problems. It provides a lightweight plastic feeding tub which is smooth, non-absorbent, rustproof, rugged, able to withstand extremes of heat and cold, and pleasant to the touch. It does not absorb odors or liquids, and it is not corroded by acids, salts, feed minerals, molasses, or other constituents of feeds. My new tub is easily assembled with its foundation boards and with its storage drums, and it is easily moved from place to place; it can be set up or taken down quite easily, quickly, and conveniently and can be put into operation within a matter of minutes.

My new tub is provided with recesses that receive and rest on a supporting frame or on boards which hold it in place and hold it up out of the mud or at any desired elevation.

When open-end 55-gallon drums are secured to the tub, enough feed can be put in the drums to last a typical group of stock, say thirty calves or foals, for about a week. The feed flows smoothly and automatically from the drum into the feeding receptacles, and the tub's structure eliminates bridging-over of feed in the passages from the drum into the tub.

The smooth, clean, non-absorbent, pleasant, nonconductive surfaces of the tub and other of its features tend to induce calves and foals to eat there, to enjoy eating there, and to clean up all of their feed. As a result, the farmer gains substantial savings by the reduction in feed waste and left-over feed. The stock animals are provided with individual compartments that space them apart and prevent crowding, yet the feeder occupies a minimum amount of space while providing a maximum feeding area.

The simplicity of the assembly and set-up of my new stock feeder enables the farmer to prevent the formation of mudholes and the destruction of pasture areas around the feeder by moving the feeder often, every month or so. One man with a pickup truck can do the job alone. The invention makes it easy to put feeders where the calves are instead of moving the calves to the feeder—as has been done heretofore, because the heavy feeders formerly in use gave the farmer no choice. The easy way to get cattle to go to a new pasture area is to put their feed there, and this becomes an easy job with my new lightweight feed tub.

The invention also comprises frame means for setting the feeder at any desired height above the ground. Thus, the feeder can be used for animals of any height. The frame, which is readily adaptable for use with the invention, may take any of several form, all of which are relatively simple to make and of sturdy and practical construction. They are light in weight and readily movable, but quite stable when in use. Also, shelter means is readily provided in a convenient, portable structure.

The six or so partitions of this feeder also enable the rancher to simultaneously feed different minerals and proteins and salts in different compartments. In contrast, many feeders are incapable of use with more than one type of feed, yet it is important to today's rancher to feed salt and mineral to his stock simultaneously. In this invention, salt may be placed in one compartment, feed in the next, mineral in a third, and so on, so that the one feeder does the job of two or three. All ingredients are immediately accessible in one place so that the cattle or horses can balance their own diet to their own needs on a free choice basis.

In summary, the feeder of this invention combines minimum weight, minimum of assembly time, minimum space consumption and minimum maintenance with maximum of feeder space availability, maximum portability, maximum efficiency, and maximum life.

Other objects and advantages will appear from the following description of a preferred form of the invention.

In the drawings:

FIG. 1 is a view in perspective of a feeding device of this invention after installation.

FIG. 4 is a view in elevation and in section taken along the line 4—4 in FIG. 2.

FIG. 5 is a horizontal sectional view of the cone, taken along the line 5—5 of FIG. 4.

FIG. 6 is a view in horizontal section taken along the line 6—6 in FIG. 2.

FIG. 7 is a bottom plan view of the tub, on a smaller scale than FIG. 2.

FIG. 10 is a somewhat further enlarged view in side elevation and in section of the tub and supporting frame of FIG. 8, with a portion of the drum shown in phantom lines and broken in order to conserve space, and also showing a shelter comprising a pole and umbrella that is readily installed.

FIG. 11 is a further enlarged fragmentary plan view in section taken along the line 11—11 of FIG. 10 with portions broken off, in order to conserve space.

Figure 3:
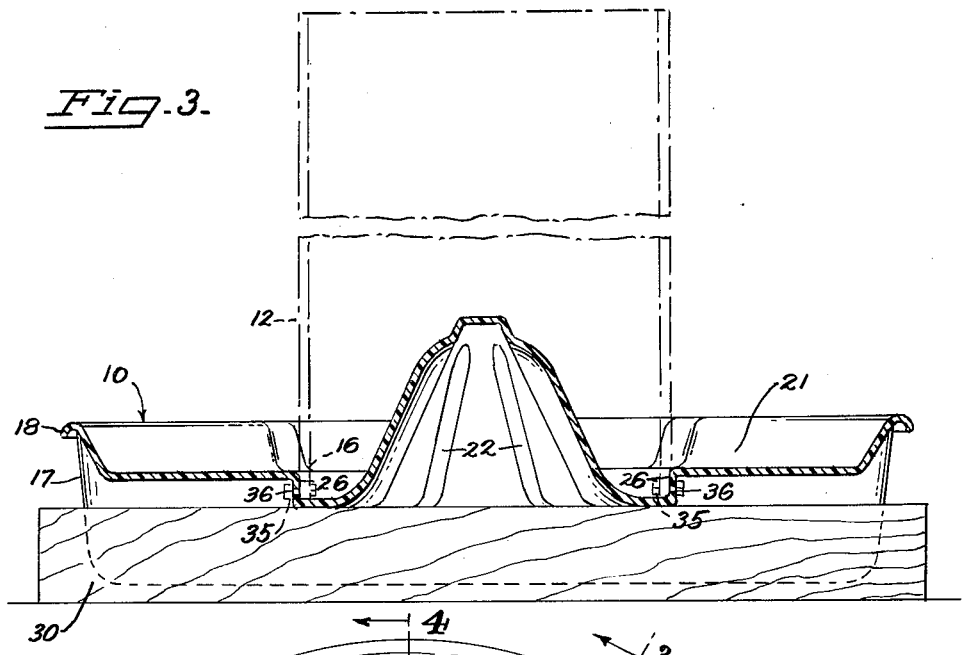
FIG. 3 is a view in elevation and in section taken along the line 3—3 in FIG. 2.
Figure 2:
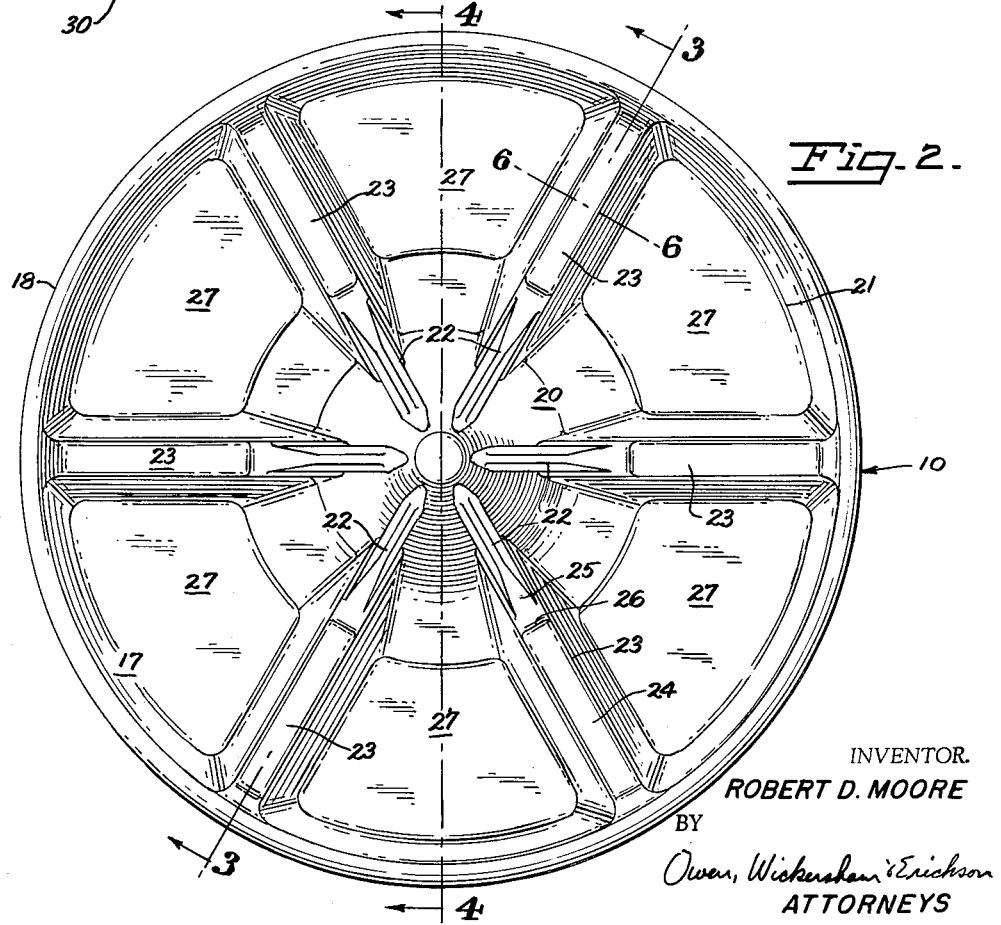
FIG. 2 is a top plan view of the tub proper, on an enlarged scale with respect to FIG. 1.
Figure 8:
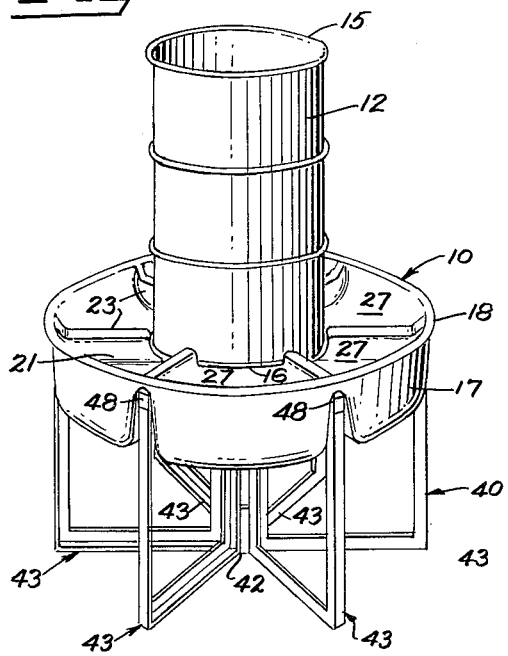
FIG. 8 is a view in perspective of the feeder tub of FIGS. 1 through 7 supported on a metal framework so as to be well above ground level. A single drum is shown installed on top of the tub.
Figure 12:
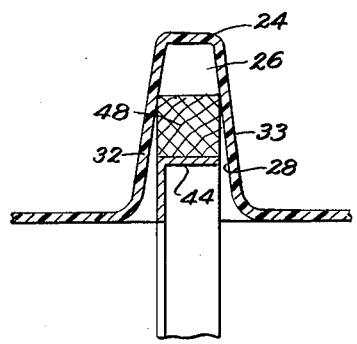
FIG. 12 is a view in elevation and in section taken along the line 12—12 in FIG. 10.
Figure 9:
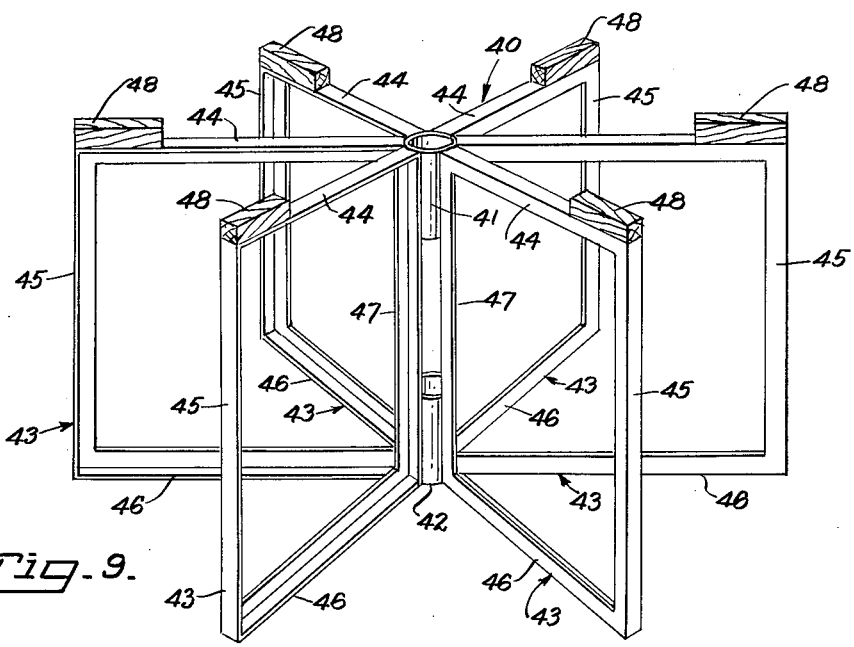
FIG. 9 is an enlarged view in perspective of the frame shown in FIG. 8.
Figure 13:
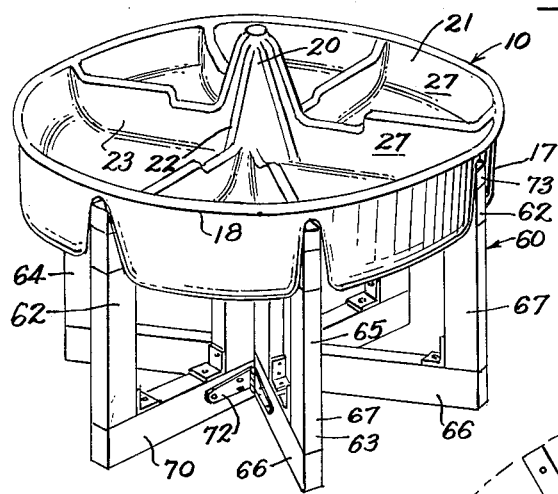
FIG. 13 is a view in perspective of the tub of the invention supported on another type of frame.

The tub 10 of this invention is preferably a one-piece plastic molding of substantially constant thickness. A preferred material is linear polyethylene, which may preferably be one-quarter inch thick before forming. Being unitary, the tub 10 requires no assembly. It ordinarily weighs about twenty pounds, will feed six calves or foals at once, and can keep thirty of either fed for a week when two 55-gallon drums 11, 12 with open ends 13, 14, 15, and 16 are stacked above them and filled with feed. For smaller quantities of feed, only one drum need be used. (Compare FIG. 8.) As the feed is eaten, more feed flows into the tub 10 from the drums. Meanwhile, the feed in the drums 11 and 12 is kept fresher than is feed that is exposed in bunkers.

The plastic tub 10 is molded to provide an outer peripheral rim 17 which is generally cylindrical with a turned-over lip 18 at its upper end. The lip 18 provides reinforcement for the rim and protects the stock from a sharp edge there; typically the lip 18 is one and one-quarter inches wide and three-quarters of an inch high. In the center of the tub 10 is an upwardly extending hollow cone 20 which serves to spread out the feed poured into the drums 11 and 12 and to direct it down into an annular feeding receptacle 21. The cone 20 is typically sixteen inches high with a flat top two and one-half inches in diameter, and it has an included angle of about 50°; this proportioning is effective in preventing bridge-over of feed, the drums being typically twenty-two or twenty-three inches in diameter.

A plurality of ribs 22, typically six, extend out radially from near the top (typically up to one inch from the top) to the bottom of the cone 20. Typically, the ribs 22 stick out about one and one-half inches beyond the cone and make a V-shape with a one-quarter inch radius at the edge and a width across each rib of about one and three-quarter inches where it merges into the surface of the cone. The bottom portions of the ribs 22 flow into and are integral with lower, generally horizontal radially extending ribs 23. For example, in a tub 10 fifty-four inches in diameter with the rim 17 ten inches high, there may be six such ribs 23 which extend from the cone 20 to the rim 17. The ribs 23 each have a higher outer portion 24, typically seven inches high, and a lower inner portion 25, typically five inches high, meeting the outer portion 24 at a step 26, typically two inches high, and fusing with a rib 22 close to the cone 20. The ribs 23 divided the feeding receptacle 21 into a plurality of feeding sections 27; for example, there may be six sections 27. If there were more ribs 22 and 23, there would be more sections 27, and fewer ribs 22 and 23 would provide fewer sections 27. In a fifty-four inch diameter tub, each segment has an outer arc about twenty-eight inches long. When the tub 10 is used as a mineral feeder for horses or cattle, no drum 11 or 12 is used, and each section 27 holds enough mineral, in block or granular form, for ten to fifteen head. The tub 10, being plastic, will not be corroded by such minerals, salts, or molasses.

The ribs 23 are hollow beneath, as shown in FIGS. 6 and 7, being a little more than two inches wide at the top and preferably having a 3° to 5° slope. Thus the ribs 23 provide radial recesses 28 beneath the tub. Into these recesses 28 are installed supporting members, such as the boards 30 and 31, shown in FIGS. 1–7, which may be two-by-sixes, two-by-eights, two-by-tens, or other sizes, depending on the desired height at which the tub 10 is to be supported above the ground, (For raising the tub 10 still higher, the frames shown in FIGS. 8–16 may be used.) One board 30 may cross completely from one side of the tub 10 to the other, and the other boards 31 may extend in from the outer edge to a point close to the center. The boards 30 and 31 support the tub 10 off the ground and hold the tub 10 in place. If desired, the boards 30 and 31 may be anchored, or they may be left free, because the weight of the feed is normally sufficient to hold the assembly down. The width-dimension of the boards 30 and 31 depends largely upon the kind of animal to be fed. For example, for horses the top of the tub 10 is preferably about one foot off the ground, while for calves, the tub 10 is preferably just a few inches above ground. The two-by-sixes, two-by-eights, or two-by-tens may rest directly on the ground or on some other structure, if that is desired. When slipped into the slots 28 beneath the tub 10, the boards 30 and 31 impart rigidity to the tub 10 as well as anchoring it to the ground. There is no necessity for punching holes in the plastic to anchor the tub 10 to the boards, for the stepped-down portions 25 rest on top of the boards 30 and 31, while on the outer areas, the boards 30 and 31 engage sloping side walls 32 and 33, as shown in FIG. 6.

The lower drum 12 rests on the stepped-down portions 25, well above the bottom surface 34 (cf. FIG. 4), and closely adjacent to the vertical steps 26. The steps 26 center the drum 12 and hold it in place at the right height above the base 34, so that the feed flows evenly. Bolts 35 may extend through openings 36 in the steps 26 and be secured to the drum 12. If the drum 12 were to be held too high, too much feed would pour into the receptacle 21, and some would be wasted or become spoiled. If the drum 12 were too low, not enough would flow out to the peripheral edge 17 of the receptacle 21. The cattle prefer to eat from about the bottom 34, and as they eat, more feed flows in by gravity flow, bringing them feed as they need it. The center cone 20 diverts the feed toward the outer periphery 17 so that the feed does not simply cake in the bottom of the drum 12 but flows into the receptacles 21 and over to the outer periphery 17. The ridges 22 keep the feed from bridging at or piling up on the ribs 23.

Since the tub 10 is round, there is better flow than there would be into a square tub, and the flow is even to all parts. There are no right angle corners and therefore no wasting of feed in such places, The partitions 23 keep each calf in his own compartment 27 so that he does not crowd over to push the neighbor out of the way.

The 55-gallon drum 12, when attached to the step 26, is filled from the top; the filling can easily be done from the back of a pickup truck; if there are two drums 11 and 12, the upper one is the one that is filled. The use of the standard 55-gallon drum is of significance, inasmuch as such drums are readily available to all farmers who buy their gasoline or diesel fuel in drums. For installation, it may be placed over the cone 20 and bolted to the plastic base 10 with angle irons or plain bolts 35 at the openings 36 where the lower end 16 of the drum 12 meets a step 26 and rib 25. The upper drum opening 13 may be provided with a cover if desired, or the entire feeding unit may be put under a roof, for inexpensive roof structures of this size are very easy to make.

In the embodiment shown in FIGS. 8 through 12 the tub 10 remains the same but is used in conjunction with a frame 40 so that it can be supported higher above the ground than by boards on edge. Some animals, such as pigs and calves, like to feed close to the ground and for them the tub 10 is preferably supported on the boards 30 and 31 as shown in FIGS. 1 through 7. However, other animals, such as horses, like to eat at a higher level and for these animals the frame 40 provides a superior installation. The frame 40 is an example of the type of frame that may be used, and it is a presently preferred example.

The frame 40 preferably incorporates an upper central pipe 41 at its upper end and a lower central pipe 42 at its lower end. Both pipes 41 and 42 may be round pipe of any desired diameter, preferably large enough to afford ample surface for welding other members to it. If desired, a single continuous pipe may of course be used, but the use of two pipes is somewhat less expensive and is quite satisfactory. Welded to the pipes 41 and 42 are a plurality, preferably six, generally rectangular frame assemblies 43, each comprising four angle irons 44, 45, 46, and 47 welded together at their ends to make a rectangle. Each frame assembly or segment 43 thus has a top horizontal angle iron 44, an outer vertical angle iron 45, a bottom horizontal angle iron 46, and an inner vertical angle iron 47. In place of angle irons, pipes or flat iron bars may be used, if desired. Angle irons, of course, impart superior strength and for that reason are shown. The four angle irons 44, 45, 46, and 47 in each frame segment 43 are welded securely together and the inner vertical angle iron 47 is welded to both the upper and lower pipes 41 and 42.

I also prefer to secure, as by screws, a wooden block 48 on the outer upper edge of each angle iron 44. This block 48 projects up and is adapted to fit into the space 28 beneath the rib 23, in substantially the same manner as that shown in FIG. 6. Thus this upper portion of the frame 40 fits snugly deep within the recesses 28 and provides quite adequate locking against rotation and prevents the animals from moving the tub 10 off the frame 40. No difficulty has been found in this regard. The bottom angle irons 46 of the frame 40 can be sunk into the ground and be held partly by the ground and to obtain still greater steadiness, if desired. For example, the bottom angle irons 46 may rest two or three inches or deeper below ground level. The vertical height of the frame 40 may be made any desired magnitude. The tub 10 is readily installed on or removed from the frame 40 when it is desired to move the tub 10 to another location, and the frame 40, itself, is readily moved when desired.

In addition, an umbrella 50 or other shelter may be provided to shade the animals, as indicated in FIG. 10. For this purpose, a pipe 51 of smaller diameter than the pipes 41 and 42 is installed through the central pipes 41 and 42, resting on the ground or going down into it, and extending up through the tub 10 and above, passing through and above the drum 12 when that is used. When this is to be done, the flat upper end 19 of the cone 20 is punched out or cut off, to enable passage of the pipe 51. The roof, awning, or umbrella 50 is secured to the top of the pipe 51. This gives shade to the animals while they eat, and the shelter becomes a removable part of the structure. There is no structure which the animals can knock over so long as the frame 40 is held firmly, as it is.

Figure 16:
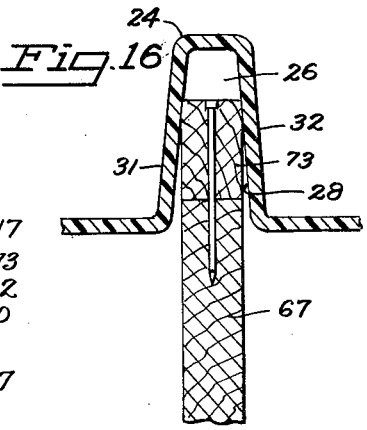
FIG. 16 is a view similar to FIG. 12 showing an installation embodying the frame of FIG. 14.
Figure 15:
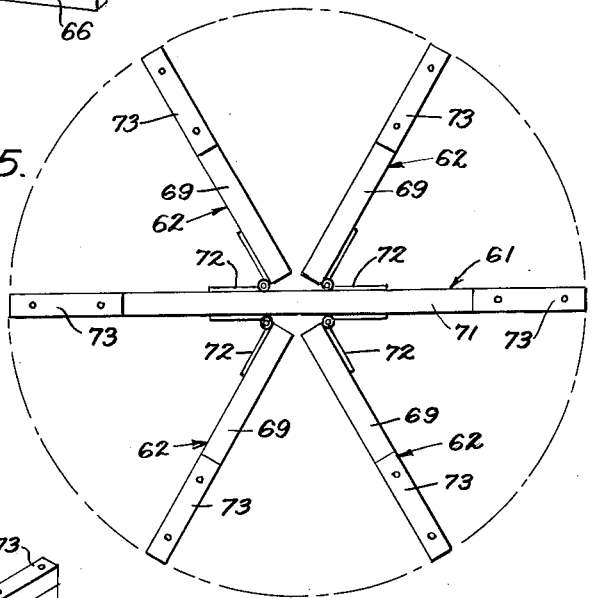
FIG. 15 is a plan view of the frame of FIG. 14 with the area of the tub indicated by a phantom circle.
Figure 14:
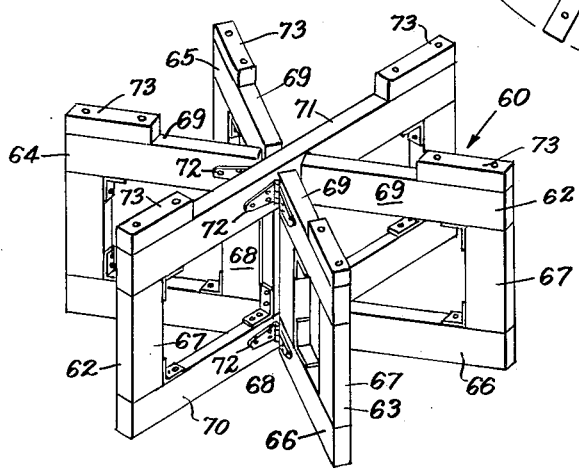
FIG. 14 is a view in perspective of the frame of FIG. 13.

FIGS. 13 through 16 show another type of supporting frame 60, which is relatively inexpensive. While most farms have welding equipment, there are some which do not and if they have timber available, they can readily make this simple frame. In this instance, the frame 60 may be made as shown in FIG. 14 from a basic support assembly 61 and four auxiliary assemblies 62, 63, 64, and 65, each assembly comprising a bottom board 66 and two vertical boards 67 and 68 nailed, or preferably bolted, to the bottom board 66 and to a top board 69. The bottom board 70 of the support assembly 61 is twice as long as the boards 66, has two end vertical boards 67, one central vertical board 68, and a top board 71 twice as long as the boards 69. The assemblies 62, 63, 64, and 65 are each hinged to the main assembly 61 by hinges 72 so that they can be folded flat against it for transportation or opened up as in FIGS. 13 to 15 to provide a stable base. When opened, they make the 60° angle with each other instead of a 90° angle in order that they may fit into the six recesses 26 of the tub. Preferably, blocks 73, like the blocks 48 surmount each top board 69, 71 and are the members extending into the recess, as shown in FIG. 16.

Some of the advantages of the invention are: the circular tub 10 feeds more calves per area and feeds them more efficiently than do long straight-line feeders; the tub 10 thus provides both greater economy of space and more even distribution of the feed. When the drums 11 and 12 are used, they need to be filled only once a week, thereby saving labor. The feed stays fresher in drums, being released only when needed, than when it is all poured out at once, to weather in ensuring days. The smooth plastic encourages calves and foals to clean up their feed, maintains a more cool temperature in the hot weather and is warmer in the cold weather, since the plastic is not a good conductor. The plastic does not dent, break, rot, or rust, nor does it absorb odors or objectionable liquids, such as molasses. The tub 10 is very light in weight, weighing only a fraction of what metal feeders weigh. The whole device is easily moved from place to place. A rancher can take the empty drums 11, 12, the empty tub 10, and a few boards 30 and 31 and toss them on the back of a pickup truck to move the feeder to a new location, thereby saving wear on his pasture, whereas metal feeders weighing ten times more require an extra man or equipment to raise them. In fact, metal feeders are often never moved, and low spots and mudholes soon develop around them. The plastic tub 10 is also much less expensive than metal tubs, and it can be cleaned by simply hosing it out, since there is no problem of rust or rot. With a single drum 11 about six hundred pounds of feed is held, and with two drums 11 and 12 stacked on top of each other, about twelve hundred pounds of feed is held. The stock animals cannot cut themselves on the plastic feeder, nor can they injure it.

Another feature of the invention is that the hollow cone 20 traps air beneath it, and in cold winter months this trapped air helps to keep the unit and its contents warm.

If desired, a farmer may mount a float valve on the side of the tub 10 and make a watering unit out of it, or he may use the tub 10 alone, without drums or reservoir, as a mineral feeder, and the tub 10 will not be corroded by minerals or salts.

Since the feeder is round, small calves and colts just learning to eat cannot be forced off feed. In rectangular feeders, these small ones tend to get shoved off the ends by bigger animals, but here, they can go around to the other side and eat.

To those skilled in the art to which this invention relates many changes in construction and widely differing embodiments and applications of the invention will suggest themselves without departing from the spirit and scope of the invention. The disclosures and the description herein are purely illustrative and are not intended to be in any sense limiting.

I claim:
1. A stock feeder, comprising,
   a one-piece molded plastic tub having a substantially constant thickness and shaped to provide a generally cylindrical outer periphery, an annular feed receptacle, a central upstanding cone, and a series of radial ribs extending out generally horizontally from said cone to said periphery to divide said receptacles into a plurality of feeding sections, said ribs each having a low radially inner portion meeting a higher radially outer portion at a step, and providing beneath said receptacle a plurality of radially extending recesses,
   supporting means having portions fitting in said recesses and extending below them so as to support said tub at a desired height above ground level, and
   a cylindrical drum supported on said ribs and secured to said steps and extending over and above said cone, said drum having an open lower end, so that feed deposited in said drum flows down over said cone and is guided into the feeding sections provided by said ribs.
2. The feeder of claim 1 wherein the ribs continue up the cone to a height adjacent the upper end thereof.
3. The feeder of claim 1 wherein said cone has a flat narrow top.
4. The feeder of claim 1 wherein said cone comprises an included angle of about 50°.
5. The feeder of claim 1 having a central vertical member extending through the top of said cone and having a shading and drum-covering shelter extending from its upper end.
6. The stock feeder of claim 1 wherein said supporting means comprises a plurality of boards fitting on edge in said recesses and wider on edge than the height of said recesses.
7. The feeder of claim 1 wherein said supporting means comprises a supporting frame that includes a plurality of rectangular frames mounted vertically and radially about a center line and secured together adjacent said center line.
8. The stock feeder of claim 7 having a removable central vertical pole extending along said center line of said frame and up through said centerline of said cone, and through said drum, and umbrella means at its upper end.
9. The stock feeder of claim 1 wherein said supporting means comprises a frame made up of a main assembly and a plurality of auxiliary assemblies, each comprising a bottom board on edge, a vertical board secured to each end of said bottom board, and a top board paralleling said bottom board and secured to said vertical boards, said main assembly being about twice as long as the auxiliary assemblies, said auxiliary assemblies each being hinged to said main assembly so that it can be folded flat thereagainst, for transportation.
10. A stock feeder, comprising,
    a one-piece molded plastic tub having a substantially constant thickness and shaped to provide a generally cylindrical outer periphery, an annular feed receptacle, a central upstanding cone, and a series of radial ribs extending out generally horizontally from said cone to said periphery to divide said receptacles into a plurality of feeding sections, said ribs each having a low radially inner portion meeting a higher radially outer portion at a step, and providing beneath said receptacle a plurality of radially extending recesses, and
    supporting means having portions fitting on edge in said recesses and extending below them so as to support said tub at a desired height above ground level.
11. The stock feeder of claim 10 wherein said supporting means comprises a plurality of boards fitting on edge in said recesses and wider on edge than the height of said recesses.
12. The stock feeder of claim 10 wherein said supporting means comprises a supporting frame that includes a plurality of rectangular frames mounted vertically and radially about a center line and secured together adjacent said center line.
13. The stock feeder of claim 12 having a removable central vertical pole extending along said center line of said frame and up through said center line of said cone, and umbrella means at its upper end.
14. The stock feeder of claim 10 wherein said supporting means comprises a frame made up of a main assembly and a plurality of auxiliary assemblies, each comprising a bottom board on edge, a vertical board secured to each end of said bottom board, and a top board paralleling said bottom board and secured to said vertical boards, said main assembly being about twice as long as the auxiliary assemblies, said auxiliary assemblies each being hinged to said main assembly so that it can be folded flat thereagainst, for transportation.
15. A stock feeder, comprising,
    a one-piece molded plastic tub having a substantially constant thickness and shaped to provide a generally cylindrical outer rim, an annular feed receptacle, a central upstanding cone and a series of radial ribs extending out from said cone for approximately its full height, with lower portions thereof extending to said rim to provide divided feeding sections, said ribs each having a low radially inner portion meeting a higher radially outer portion at a step, the lower side of said ribs beneath the tub providing a plurality of radially extending recesses generally rectangular in cross section, and
    support means fitting snugly into said recesses so as to support said tub at a desired height above ground.
16. A stock feeder, comprising,
    a one-piece molded plastic tub having a substantially constant thickness and shaped to provide a generally cylindrical outer rim, an annular feed receptacle, a central upstanding cone and a series of radial ribs extending out from said cone for approximately its full height, with lower portions thereof extending to said rim to provide divided feeding sections, said ribs each having a low radially inner portion meeting a higher radially outer portion at a step, the lower side of said ribs beneath the tub providing a plurality of radially extending recesses generally rectangular in cross section,
    tub support means fitting in said recesses so as to support said tub at a desired height above ground, and
    a cylindrical drum supported on said ribs and bolted to said steps and extending over and above said cone, said drum being open at both ends for receiving and containing feed, which flows down as needed over said cone and is guided into said sections by said ribs.
17. A stock feeder, comprising,
    a one-piece molded plastic tub having a substantially constant thickness and shaped to provide
    a generally cylindrical outer rim having a smoothly turned-over lip,
    an annular feed receptacle,
    a hollow central upstanding frustum of a cone having an included angle of about 50°,
    a series of V-shaped generally vertical ribs extending out from said frustum cone for its full height, and
    a series of radial horizontal hollow ribs with sloping side walls and with lower portions thereof extending from said vertical ribs to said rim to provide divided feeding sections, the horizontal lower portions of said ribs each having a low radially inner portion meeting a higher radially outer portion at a step, the spaces beneath the radial ribs providing a plurality of radially extending recesses with steeply sloping side walls, a plurality of boards on edge in said recesses and wider on edge than the height of said recesses, so as to support said tub at a desired height above ground, and a cylindrical drum supported on said ribs adjacent said steps and bolted to said steps and extending over and above said frustum, the interior of said drum being substantially wider than said frustum, said drum being open at both ends for receiving and containing feed and for supplying it to said receptacle, the feed flowing down over said frustum and guided into said sections by said ribs.

18. A one-piece molded plastic tub for animals, having a substantially constant thickness and shaped to provide a generally cylindrical outer rim having a continuous circular smoothly turned-over lip providing a rounded animal-protective surface all around said rim, an annular feed receptacle, a hollow central upstanding frustum of a cone having an included angle of about 50° and extending up from the bottom of said tub to a height well above said rim, a series of V-shaped generally vertical ribs extending radially out from said frustum for its full height, and a series of radial horizontal hollow ribs having their upper surfaces lying at a level lower than said lip with steeply sloping side walls extending from and continuous with said vertical ribs to said rim and dividing said receptacle into pie-cut shaped feeding sections, each said rib having a radially inner portion and a radially outer portion meeting each other at a step, said radially outer portion being higher than said radially inner portion, the spaces beneath the radial ribs providing a plurality of radially extending recesses with steeply sloping side walls adapted to receive the upper portions of a supporting frame into said recesses to support said tub on said frame at a desired height above ground, said horizontal ribs being adapted to support a cylindrical drum open at both ends adjacent said steps with the drum bolted to said steps and extending over and above said frustum, for receiving and containing feed and for supplying it to said receptacle, the feed flowing down over said frustum and guided into said sections by said generally vertical ribs.

References Cited by the Examiner
UNITED STATES PATENTS

| | | | |
|---|---|---|---|
| 2,344,367 | 3/44 | Pueschel | 119—52 |
| 2,700,284 | 1/55 | Lyon | 220—23.8 |

SAMUEL KOREN, *Primary Examiner.*

HUGH R. CHAMBLEE, *Examiner.*